United States Patent
Kang et al.

(10) Patent No.: US 10,429,566 B2
(45) Date of Patent: Oct. 1, 2019

(54) LIGHT SOURCE MODULE, AND BACKLIGHT UNIT AND LIQUID CRYSTAL DISPLAY DEVICE INCLUDING THE SAME

(71) Applicant: LG Display Co., Ltd., Seoul (KR)

(72) Inventors: MinJae Kang, Paju-si (KR); Jaeyong Choi, Paju-si (KR); MyungWon Seo, Bucheon-si (KR); Kiyong Yang, Seoul (KR); SeungJun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/846,693

(22) Filed: Dec. 19, 2017

(65) Prior Publication Data

US 2018/0180791 A1 Jun. 28, 2018

(30) Foreign Application Priority Data

Dec. 27, 2016 (KR) .................. 10-2016-0180052

(51) Int. Cl.
   *F21V 8/00* (2006.01)
   *G02F 1/1333* (2006.01)
   *G02F 1/1335* (2006.01)

(52) U.S. Cl.
   CPC ........... *G02B 6/0023* (2013.01); *G02B 6/009* (2013.01); *G02B 6/0068* (2013.01); *G02B 6/0083* (2013.01); *G02B 6/0091* (2013.01); *G02F 1/133308* (2013.01); *G02F 1/133615* (2013.01); *G02B 6/0051* (2013.01); *G02B 6/0053* (2013.01); *G02B 6/0055* (2013.01); *G02B 6/0088* (2013.01); *G02F 2001/13332* (2013.01); *G02F 2201/50* (2013.01); *G02F 2201/503* (2013.01)

(58) Field of Classification Search
   CPC .. G02B 6/0081; G02B 6/0085; G02B 6/4219; G02B 6/4428; G02B 6/4244; G02B 6/4245; G02B 6/4275; H01L 23/60; G02F 2001/133334; G02F 2001/133322; G02F 2201/503; G02F 2202/22
   See application file for complete search history.

(56) References Cited

U.S. PATENT DOCUMENTS

| | | |
|---|---|---|
| 2010/0177263 A1 | 7/2010 | Kuramoto |
| 2012/0081925 A1 | 4/2012 | Cho et al. |
| 2012/0147625 A1* | 6/2012 | Yang .................. G02B 6/0085 362/612 |
| 2015/0138827 A1 | 5/2015 | Song et al. |
| 2017/0108638 A1* | 4/2017 | Teragawa ............. G02B 6/0088 |

* cited by examiner

*Primary Examiner* — Angela K Davison
(74) *Attorney, Agent, or Firm* — Morgan, Lewis & Bockius LLP

(57) ABSTRACT

Disclosed are a light source module, a backlight unit including the same, and an LCD device including the same, which prevent image quality and reliability from being degraded. The light source module includes a plurality of light sources mounted on a printed circuit board (PCB), an optical member provided on the PCB to surround the plurality of light sources, and a conductive member coupled to the optical member. The conductive member includes a protrusion grounding the conductive member.

10 Claims, 6 Drawing Sheets

LIGHT SOURCE MODULE, AND BACKLIGHT UNIT AND LIQUID CRYSTAL DISPLAY DEVICE INCLUDING THE SAME

CROSS-REFERENCE TO RELATED APPLICATIONS

This application claims the benefit of the Korean Patent Application No. 10-2016-0180052 filed on Dec. 27, 2016, which is hereby incorporated by reference as if fully set forth herein.

BACKGROUND

Technical Field

The present disclosure relates to a light source module, a backlight unit including the same, and a liquid crystal display (LCD) device including the same.

Discussion of the Related Art

Active matrix type LCD devices display a moving image by using a thin film transistor (TFT) as a switching element. The LCD devices can be miniaturized unlike cathode ray tube (CRT), and thus, are applied to display devices of portable information devices, office machines, computers, etc., in addition to televisions (TVs). Therefore, the LCD devices quickly replace the CRT. Since the LCD devices are not self-emitting devices, a backlight unit is provided under a liquid crystal panel, and an image is displayed by using light emitted from the backlight unit.

The backlight unit is categorized into a direct type backlight unit and an edge type backlight unit depending on a structure where a light source is arranged. The edge type backlight unit has a structure where the light source is disposed on one side of a light guide plate, and the direct type backlight unit has a structure where the light source is disposed under the liquid crystal panel. Here, the direct type backlight unit has a limitation in thinning, and thus, is mainly applied to LCD devices where brightness is more important than a thickness of a panel. The edge type backlight unit capable of thinning and miniaturizing unlike the direct type backlight unit is mainly applied to LCD devices where a thickness is important like notebook personal computers (PCs), monitor PCs, etc.

In the backlight unit, the light guide plate is disposed on the light source so as to reflect light, emitted from the light source, to the liquid crystal panel. In a process of disposing the light guide plate on the light source, a protective film attached on the light guide plate is removed, and at this time, static electricity occurs in the light guide plate. The static electricity occurring in the light guide plate is transferred to the light source, causing a short circuit defect where a portion of the light source is darkly burned. For this reason, in the backlight unit and the LCD devices of the related art, the light source is damaged by the static electricity, and image quality and reliability are degraded.

SUMMARY

Accordingly, the present disclosure is directed to provide a light source module, a backlight unit including the same, and a liquid crystal display (LCD) device including the same that substantially obviate one or more problems due to limitations and disadvantages of the related art.

An aspect of the present disclosure is directed to provide a light source module, a backlight unit including the same, and an LCD device including the same, which prevent image quality and reliability from being degraded.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, a light source module comprises a plurality of light sources mounted on a printed circuit board (PCB), an optical member provided on the PCB to surround the plurality of light sources, and a conductive member coupled to the optical member, a backlight unit including the same, and a liquid crystal display (LCD) device including the same. The conductive member may include a protrusion grounding the conductive member.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principles of the disclosure. In the drawings.

DETAILED DESCRIPTION

Figure 1:
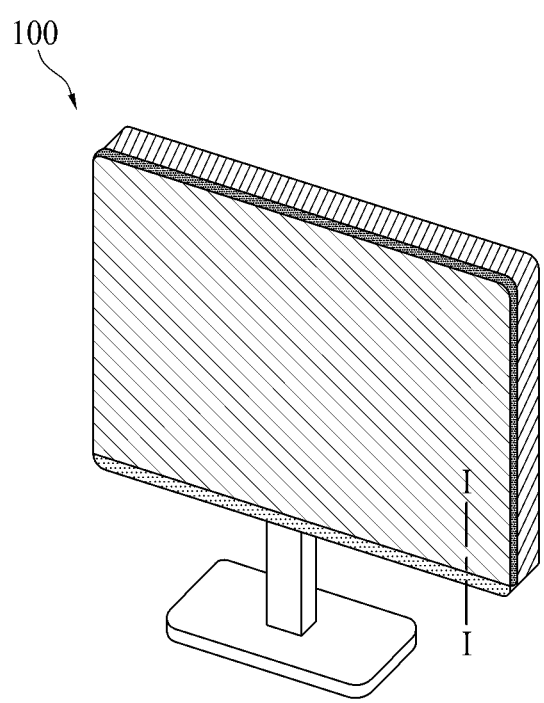
FIG. 1 is a perspective view of an LCD device according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of an organic light emitting display device according to the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

Hereinafter, embodiments of the present disclosure will be described in detail with reference to the accompanying drawings.

Figure 2:
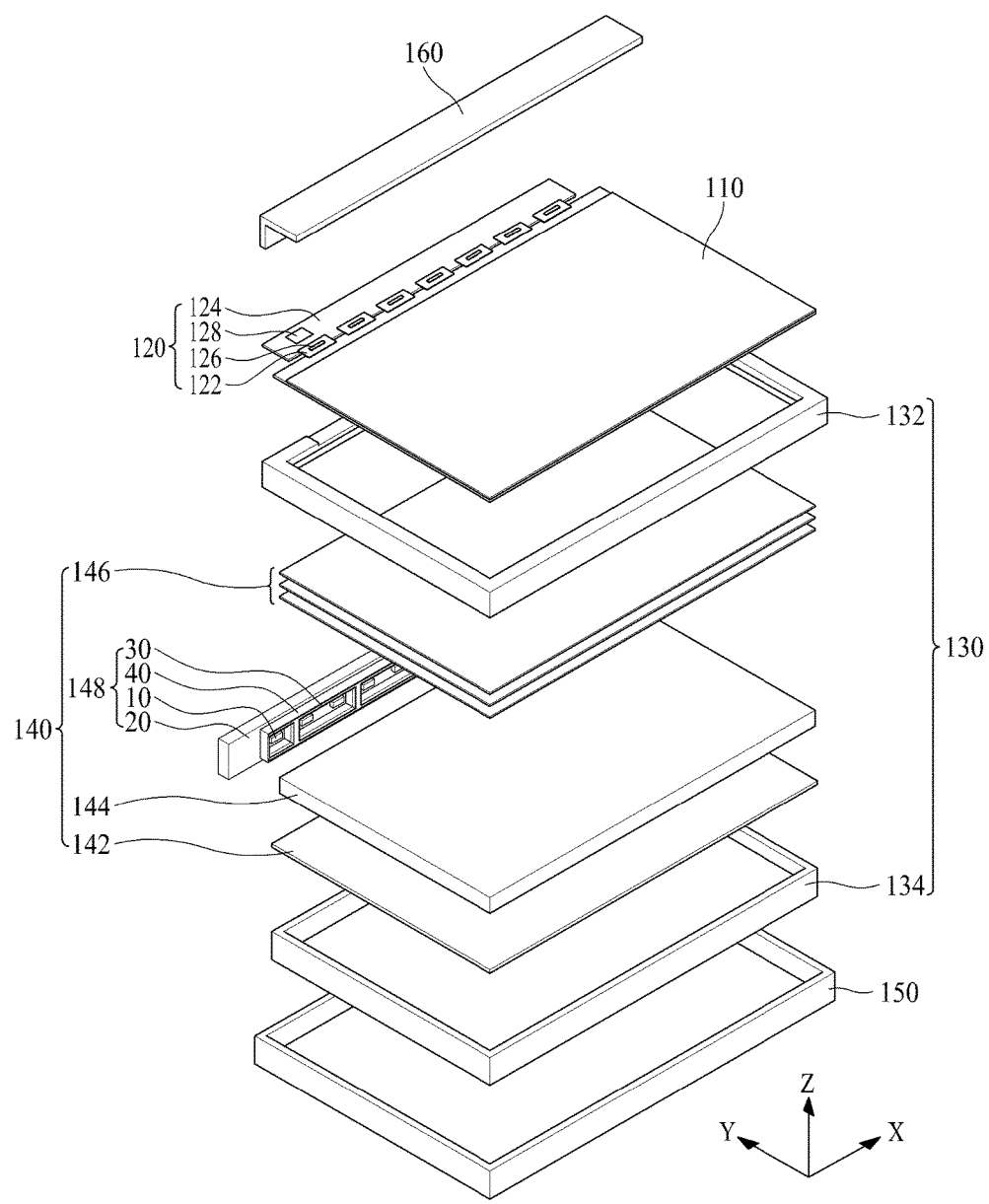
FIG. 2 is an exploded perspective view for describing in detail an LCD device according to an embodiment of the present disclosure.
Figure 3:
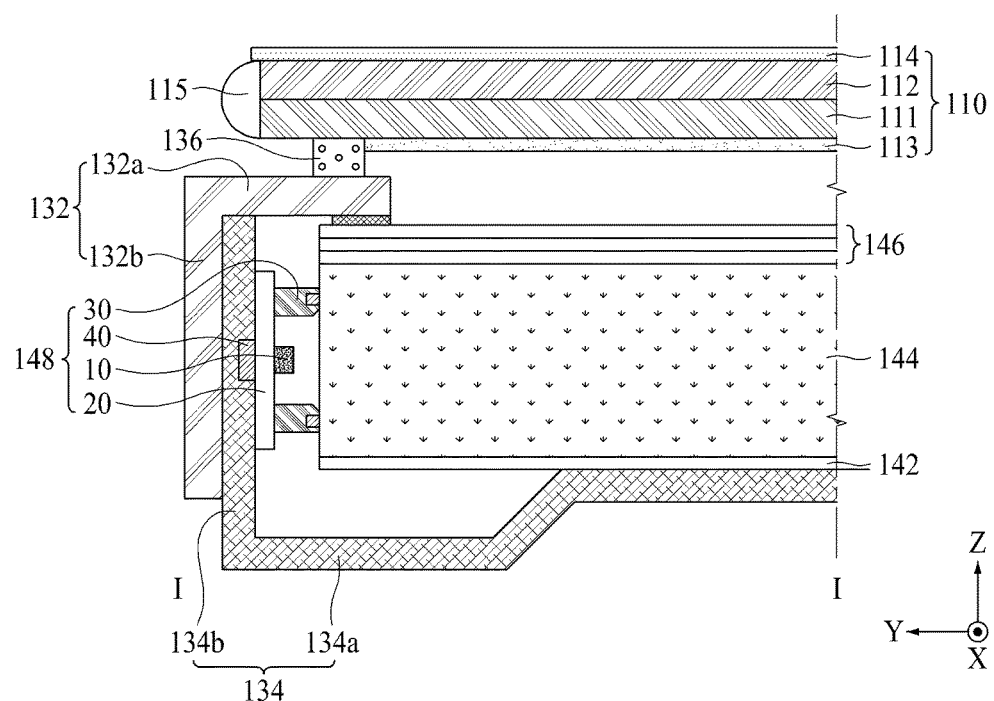
FIG. 3 is a cross-sectional view of an LCD device according to an embodiment of the present disclosure.

FIG. 1 is a perspective view of an LCD device according to an embodiment of the present disclosure. FIG. 2 is an exploded perspective view for describing in detail an LCD device according to an embodiment of the present disclosure. FIG. 3 is a cross-sectional view of an LCD device according to an embodiment of the present disclosure.

Referring to FIGS. 1 to 3, the LCD device according to an embodiment of the present disclosure may include a liquid crystal panel 110, a panel driver 120, a panel supporting part 130, a backlight unit 140, an appearance case 150, and a front cover 160.

The liquid crystal panel 110 may display an image by using light irradiated from the backlight unit 140. The liquid crystal panel 110 may adjust a light transmittance of a liquid crystal layer to display an image and may include a lower substrate 111 and an upper substrate 112 facing-bonded to each other with the liquid crystal layer (not shown) therebetween, a lower polarization member 113 attached on the lower substrate 111, an upper polarization member 114 attached on the upper substrate 112, and a side sealing member 115 attached on a side surface of the upper substrate 112. The liquid crystal panel 110 may drive the liquid crystal layer with an electric field which is generated in each of a plurality of pixels according to a common voltage and a data voltage applied to each pixel, thereby displaying a color image according to a light transmittance of the liquid crystal layer.

The lower substrate 111 may be a thin film transistor (TFT) array substrate and may include a plurality of pixels (not shown) respectively provided in a plurality of pixel areas defined by intersections of a plurality of gate lines (not shown) and a plurality of data lines (not shown). Each of the pixels may include a TFT connected to a data line and a gate line, a pixel electrode connected to the TFT, and a common electrode which is disposed adjacent to the pixel electrode and is supplied with a common voltage. In this case, the common electrode may be disposed on the upper substrate 112 depending on a driving mode of the liquid crystal layer. An electric field corresponding to a difference voltage between the data voltage and the common voltage applied to each pixel of the lower substrate 111 may be generated to adjust a light transmittance of color light passing through the upper substrate 112 and the liquid crystal layer, thereby allowing the liquid crystal panel 110 to display a color image.

A pad part (not shown) which is supplied with various signals for driving each pixel may be provided under or on the lower substrate 111. In this case, the panel driver 120 for driving the liquid crystal panel 110 may be connected to the pad part.

The upper substrate 112 may be a color filter array substrate and may be provided to have an area which is relatively smaller than the lower substrate 111. The upper substrate 112 may be bonded to the lower substrate 111 with the liquid crystal layer therebetween to overlap an area other than the pad part of the lower substrate 111. In this case, the upper substrate 112 may include a widthwise and lengthwise light blocking layer (not shown) for defining a pixel area corresponding to each pixel provided on the lower substrate 111, an edge light blocking layer (not shown) provided in an edge of the upper substrate 112, and a color filter (not shown) provided in each of the pixel areas. The color filter may filter light, which is incident through the lower substrate 111 from the backlight unit 140 and travels the light toward the upper substrate 112, into color light. The common electrode (not shown) which is supplied with the common voltage may be disposed on the upper substrate 112 depending on a driving mode of the liquid crystal layer.

A detailed structure of each of the lower substrate 111 and the upper substrate 112 may be implemented as various types well known to those skilled in the art, based on a driving mode of the liquid crystal layer, for example, a twisted nematic (TN) mode, a vertical alignment (VA) mode, an in-plane switching (IPS) mode, and a fringe field switching (FFS) mode.

The lower polarization member 113 may be attached on a rear surface of the lower substrate 111 and may be disposed in a portion other than an end of the lower substrate 111. The lower polarization member 113 may polarize light incident from the backlight unit 140.

The upper polarization member 114 may be attached on a top of the upper substrate 112 and may polarize color light which passes through the upper substrate 112 and is output to the outside.

The side sealing member 115 may be disposed to cover a side surface of each of the lower substrate 111 and the upper substrate 112, for preventing the leakage of light and protecting the side surface of each of the lower substrate 111 and the upper substrate 112. The side sealing member 115 may be formed of a thermocurable resin, photocurable resin, and/or the like.

The panel driver 120 may be connected to the pad part provided on the lower substrate 111 to drive each pixel of the liquid crystal panel 110, thereby allowing the liquid crystal panel 110 to display a color image. The panel driver 120 according to an embodiment may include a plurality of circuit films 122 connected to the pad part of the liquid crystal panel 110, a data driving integrated circuit (IC) 126 mounted on each of the plurality of circuit films 122, a display printed circuit board (PCB) 124 coupled to each of the plurality of circuit films 122, and a timing controller 128 mounted on the display PCB 124.

Each of the circuit films 122 may be attached between the pad part of the lower substrate 111 and the display PCB 124 through a film attaching process and may be formed of a tape carrier package (TCP) or a chip-on film (COF) (or a chip on flexible board). Each of the circuit films 122 may be bent along one side surface (i.e., a lower surface) of the liquid crystal panel 110 and may be disposed on a rear surface of a guide frame 132.

The data driving IC 126 may be mounted on each of the plurality of circuit films 122 and may be connected to the pad part through the circuit film 122. The data driving IC 126 may receive pixel-based pixel data and a data control signal supplied from the timing controller 128, convert the pixel-based pixel data into an analog data signal according to the data control signal, and supply the analog data signal to a corresponding data line through the pad part.

The display PCB 124 may be connected to the plurality of circuit films 122. The display PCB 124 may supply signals, which are necessary for displaying an image on each pixel of the liquid crystal panel 110, to the data driving IC 126 and a gate driving circuit. To this end, various signal lines, various power circuits (not shown), and a memory device (not shown) may be mounted on the display PCB 124.

The timing controller 128 may be mounted on the display PCB 124. In response to a timing sync signal supplied from an external driving system (not shown), the timing controller 128 may align digital video data input from the driving system according to a pixel arrangement structure of the liquid crystal panel 110 to generate the pixel-based pixel data and may supply the generated pixel-based pixel data to the data driving IC 126. Also, the timing controller 128 may generate a data control signal and a gate control signal based on the timing sync signal to control a driving timing of each of the data driving IC 126 and the gate driving circuit.

In addition, the timing controller 128 may control the backlight unit 140 by using edge type local diming technology to individually control an area-based luminance of the liquid crystal panel 110.

The panel supporting part 130 may include the guide frame 132 and a light source housing 134.

The guide frame 132 may be disposed under the liquid crystal panel to support the liquid crystal panel 110. The guide frame 132 may be coupled to the liquid crystal panel 110 through a panel coupling member 136. In this case, the panel coupling member 136 may be coupled to the lower substrate 111 of the liquid crystal panel 110, based on a coupling force between the guide frame 132 and the liquid crystal panel 110 and a thickness of each of the guide frame 132 and the liquid crystal panel 110, but is not limited thereto. In other embodiments, the panel coupling member 136 may be coupled to the lower polarization member 113 of the liquid crystal panel 110. For example, the panel coupling member 136 may be a double-sided tape, a thermocurable adhesive, a photocurable adhesive, a foam tape, or the like, and particularly, may be the double-sided tape or the foam tape having a certain elastic force for absorbing an impact. In addition, the panel coupling member 136 may include a hollow portion, and in this case, the hollow portion reduces pressure applied to the liquid crystal panel 110 and prevents the panel coupling member 136 from being stripped from the liquid crystal panel 110 when the liquid crystal panel 110 moves.

The guide frame 132 may include a panel coupling part 132a and a guide side wall 132b.

The panel coupling part 132a may be coupled to a rear edge of the liquid crystal panel 110 by the panel coupling member 136. In this case, the panel coupling part 132a may be coupled to a rear edge of the lower substrate 111 by the panel coupling member 136, but is not limited thereto. In other embodiments, the panel coupling part 132a may be coupled to an edge of the lower polarization member 113 attached on a whole rear surface of the lower substrate 111.

The guide side wall 132b may be bent vertically from the panel coupling part 132a and may be coupled to the light source housing 134. In this case, a coupling groove may be provided in the guide side wall 132b, and thus, the guide side wall 132b may be coupled to the light source housing 134.

The light source housing 134 may accommodate the backlight unit 140 and may support the guide frame 132. Also, the light source housing 134 according to an embodiment of the present disclosure may dissipate heat, occurring in a light source 10, to the outside. Therefore, the light source housing 134 according to an embodiment of the present disclosure may be formed of a material capable of dissipating heat, and for example, may be formed of aluminum, but is not limited thereto. The light source housing 134 may include a floor 134a and a housing side wall 134b.

The floor 134a may support the light guide plate 144, and an end of the floor 134a may be bent, thereby supporting the light guide plate 144.

The housing side wall 134b may be bent vertically from one end of the floor 134a and may be coupled to the guide side wall 132b of the guide frame 132. In this case, a projection may be provided in the housing side wall 134b and may be coupled to a groove provided in the guide side wall 132b, and for example, the housing side wall 134b may be mutually coupled to the guide side wall 132b by a fastening member such as a screw.

The backlight unit 140 may be disposed under the liquid crystal panel 110 to irradiate light onto a lower surface. Therefore, the backlight unit 140 may be disposed under the liquid crystal panel 110. In this case, the backlight unit 140 may be accommodated into the light source housing 134. The backlight unit 140 according to an embodiment may include a reflective sheet 142, the light guide plate 144, an optical sheet part 146, and a light source module 148.

The reflective sheet 142 may be disposed on a bottom of the light guide plate 144 to reflect light, which is incident from the light guide plate 144, toward the light guide plate 144, thereby minimizing the loss of light traveling to a rear surface of the light guide plate 144.

The light guide plate 144 may include a light incident surface provided on a first side surface thereof and may be implemented in a plate shape (or a wedge shape). The light guide plate 144 may allow light incident through the light incident surface from the light source module 148 to travel toward the liquid crystal panel 110.

The optical sheet part 146 may be disposed on the light guide plate 144 and may include a lower diffusive sheet, a prism sheet, and an upper diffusive sheet, but is not limited thereto. In other embodiments, the optical sheet part 146 may be configured by a stacked combination of two or more elements selected from among a diffusive sheet, a prism sheet, a dual brightness enhancement film, and a reticular sheet.

The light source module 148 may be disposed to face the first side surface of the light guide plate 144 and may be provided on one side surface of the light guide plate 144 to irradiate light onto the light incident surface. The light source module 148 according to an embodiment may include a plurality of light sources 10 which are mounted on a light source PCB 20 and emit lights according to a light source driving signal supplied from a backlight driver (not shown), an optical member 30 which surrounds the plurality of light sources 10, and a conductive member 40 which is accommodated into the optical member 30.

In a backlight unit and an LCD device of the related art, static electricity occurs in a process of removing the protective film attached on the light guide plate 144 and is transferred to the light source 10, causing a short circuit defect where a portion of the light source 10 is darkly burned. On the other hand, in the backlight unit 140 and the LCD device 100 according to an embodiment of the present disclosure, the conductive member 40 may be disposed between the light guide plate 144 and the light source 10, and a protrusion of the conductive member 40 may be electrically connected to the light source housing 134, whereby static electricity flows out to the light source housing 134 without being transferred to the light sources 10. Accordingly, since the light source module 148 including the conductive member 40 is provided, the backlight unit 140 and the LCD device 100 according to an embodiment of the present disclosure prevent a short circuit defect of the light source 10 from occurring due to static electricity, thereby preventing image quality and reliability from being degraded.

In FIG. 3, it is illustrated that the conductive member 40 of the light source module 148 is coupled to the groove provided in the light source housing 134, but the present embodiment is not limited thereto. In other embodiments, the conductive member 40 may be disposed to contact the light source housing 134 without a groove provided in the housing side wall 134b.

The light source module 148 will be described below in detail with reference to FIGS. 4 to 7.

The appearance case 150 may accommodate the light source housing 134 and may surround a side surface of the guide frame 132, thereby forming an appearance.

The front cover 160 may be coupled to the guide frame 132 to cover one edge of the liquid crystal panel 110. The front cover 160 may conceal the panel driver 120 connected to the one edge of the liquid crystal panel 110.

Figure 4:
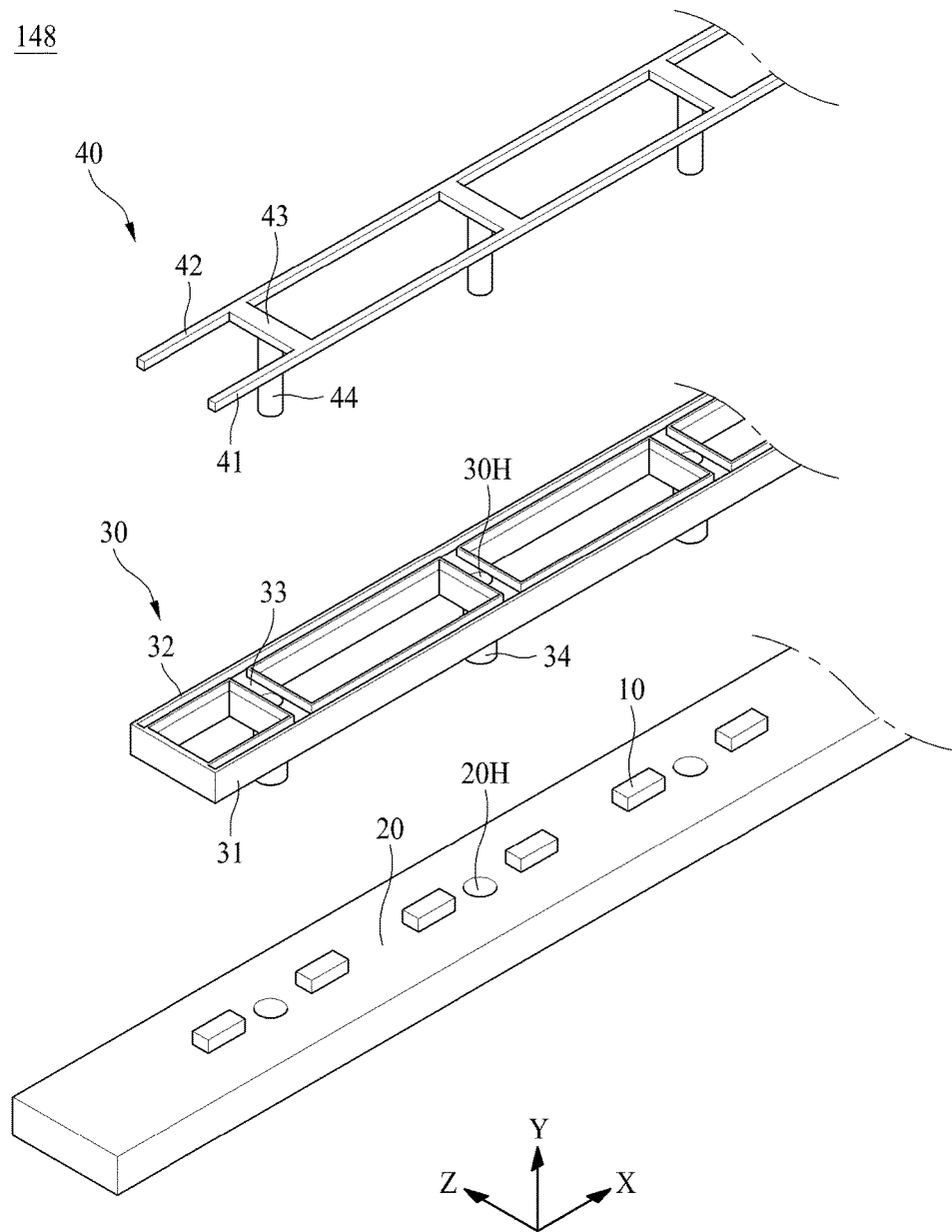
FIG. 4 is an exploded perspective view of a light source module according to an embodiment of the present disclosure when seen above.
Figure 5:
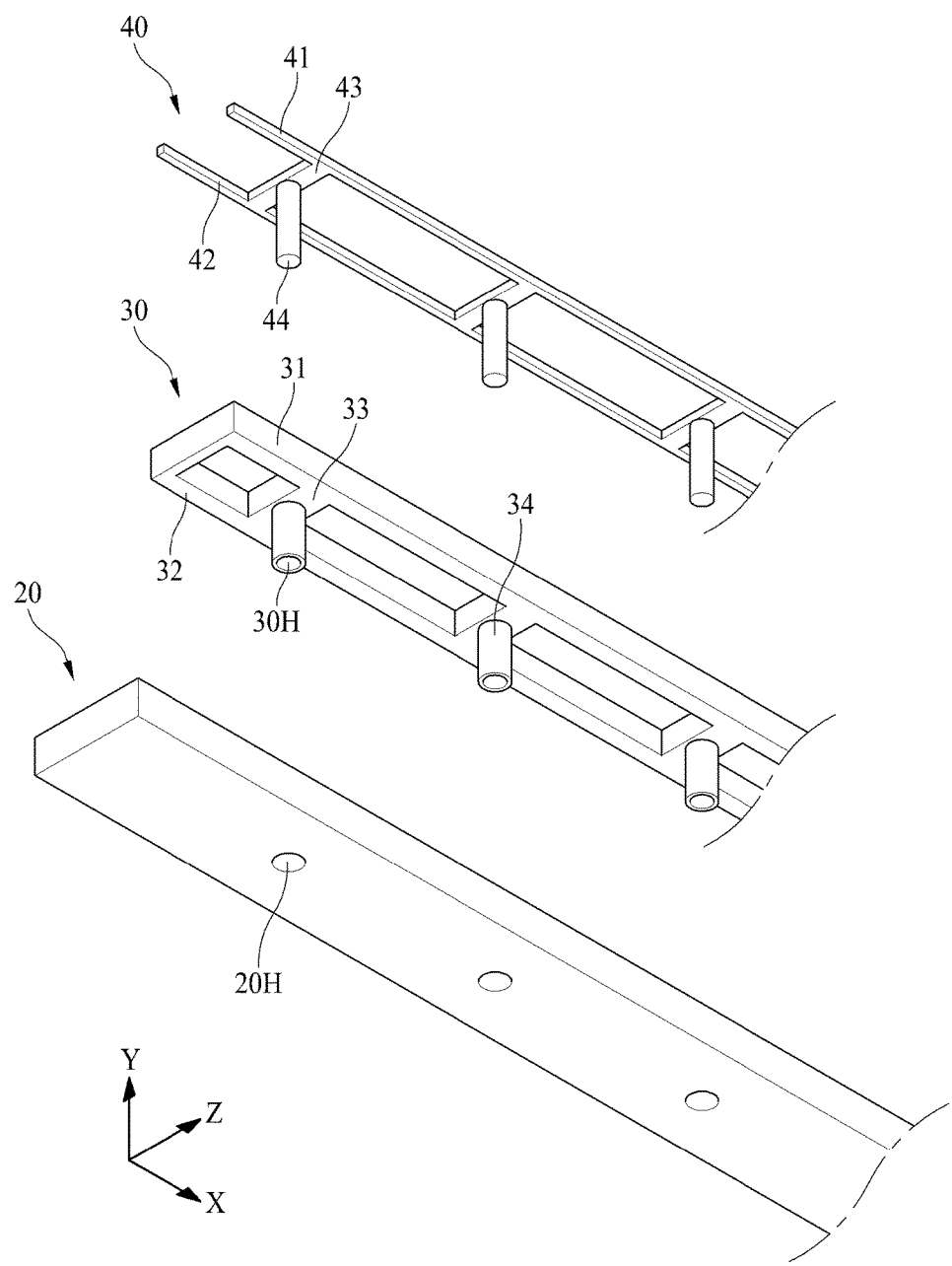
FIG. 5 is an exploded perspective view of a light source module according to an embodiment of the present disclosure when seen below.
Figure 6:
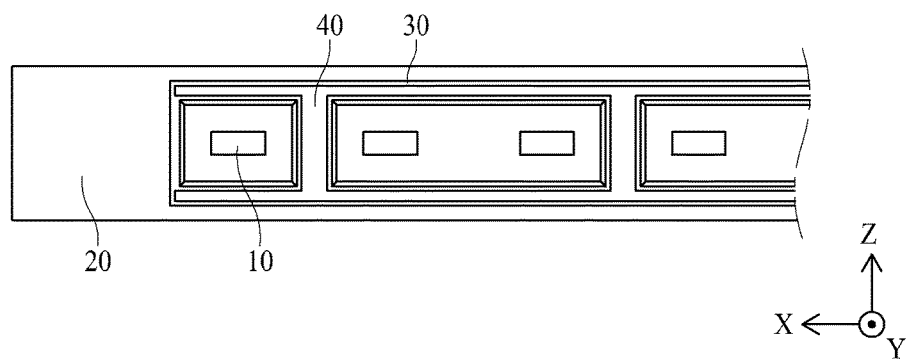
FIG. 6 is a plan view of a light source module according to an embodiment of the present disclosure when seen above.
Figure 7:
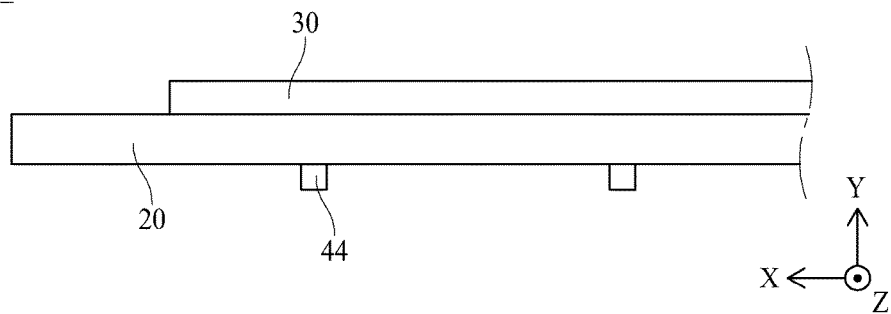
FIG. 7 is a plan view of a light source module according to an embodiment of the present disclosure when seen from side.

FIG. 4 is an exploded perspective view of the light source module according to an embodiment of the present disclosure when seen above, and FIG. 5 is an exploded perspective view of the light source module according to an embodiment of the present disclosure when seen below. FIG. 6 is a plan view of the light source module according to an embodiment of the present disclosure when seen above, and FIG. 7 is a plan view of the light source module according to an embodiment of the present disclosure when seen from side.

Referring to FIGS. 4 to 7, the light source module 148 according to an embodiment of the present disclosure may include a light source 10, a PCB 20, an optical member 30, and a conductive member 40.

One or more light sources 10 may be mounted on the PCB 20. The light source 10 may be electrically connected to a driving power line provided on the PCB 20 and may emit light with a driving power suppled through the driving power line. The light source 10 may emit first color light with the driving power. For example, the light source 10 may be a white light emitting diode chip that emits white light. Also, the light source 10 may have a structure such as a lateral chip structure, a flip chip structure, a vertical chip structure, a lead frame package structure, a chip scale package structure, or the like.

The PCB 20 may include the driving power line to which the driving power is supplied from the outside. The PCB 20 may supply the driving power, supplied through the driving power line from the outside, to the light source 10 to allow the light source 10 to emit light. In the PCB 20 according to an embodiment of the present disclosure, a coupling hole 20H may be provided in a portion other than portions where the light sources 10 are disposed. The coupling hole 20H may be provided between adjacent light sources of the plurality of light sources 10 and may pass through the PCB 20. The coupling hole 20H may have a size which enables the coupling hole 20H to be coupled to a below-described coupling projection 34 of the optical member 30.

The optical member 30 may be disposed on the PCB 20, and in more detail, may be disposed between the PCB 20 and a light incident surface of the light guide plate 144. The optical member 30 according to an embodiment of the present disclosure maintains a constant optical gap between the light guide plate 144 and the light source 10. The optical member 30 may have a frame form which surrounds the plurality of light sources 10. The optical member 30 according to an embodiment of the present disclosure may surround the plurality of light sources 10 to prevent lights emitted from the light sources 10 from being incident on an area other than the light incident surface of the light guide plate 144, thereby minimizing the loss of the lights. The optical member 30 may include a groove that surrounds the plurality of light sources 10 and supports or accommodates the conductive member 40.

The optical member 30 may be formed of a material through which electricity does not flow, and for example, may be formed of a material such as polyphthalamide (PA6T), polyamide 9 and terephtalic acid (PAST), PA10T, polycyclohexylene dimethyl terephthalate (PCT), liquid crystal polymer (LCP), or epoxy mold compound (EMC), but is not limited thereto. The optical member 30 according to an embodiment of the present disclosure may include a first optical member side surface 31, a second optical member side surface 32, an optical member connecting part 33, and a supporting part 70.

The first optical member side surface 31 may be disposed on one side of the light source 10 and may contact the PCB 20. A length of the first optical member side surface 31 in an X axis direction may be equal to or less than a length of the PCB 20 in the X axis direction. A first substrate supporting surface contacting the PCB 20, a first light guide plate supporting surface facing the first substrate supporting surface, and a first coupling groove provided in the first light guide plate supporting surface may be provided in a lower portion of the first optical member side surface 31. The first coupling groove may be coupled to the below-described conductive member 40. A size of the first coupling groove may be equal to or greater than that of the below-described conductive member 40, or may have the same size. The first light guide plate supporting surface maintains an optical gap between the light source 10 and the light guide plate 144 capable of expanding at a high temperature.

The second optical member side surface 32 may be disposed on the other side of the light source 10 and may face the first optical member side surface 31 and contact the PCB 20. A length of the second optical member side surface 32 in the X axis direction may be equal to or less than the length of the PCB 20 in the X axis direction. A second substrate supporting surface contacting the PCB 20, a second light guide plate supporting surface facing the second substrate supporting surface, and a second coupling groove provided in the second light guide plate supporting surface may be provided on one side of the second optical member side surface 32. The second coupling groove may be coupled to the below-described conductive member 40. A size of the second coupling groove may be equal to or greater than that of the below-described conductive member 40, or may have the same size. The second light guide plate supporting surface maintains the optical gap between the light source 10 and the light guide plate 144 capable of expanding at a high temperature.

The optical member connecting part 33 may connect the first optical member side surface 31 and the second optical member side surface 32. The optical member connecting part 33 may be disposed between adjacent light sources of the plurality of light sources 10. A length of the optical member connecting part 33 in a Z axis direction may be equal to or less than a length of the PCB 20 in the Z axis direction. A third substrate supporting surface contacting the PCB 20, a third light guide plate supporting surface facing the third substrate supporting surface, and a third coupling groove provided in the third light guide plate supporting surface may be provided on one side of the optical member connecting part 33. The third coupling groove may be coupled to the below-described conductive member 40. A size of the third coupling groove may be equal to or greater than that of the below-described conductive member 40, or may have the same size. The third light guide plate supporting surface maintains the optical gap between the light source 10 and the light guide plate 144 capable of expanding at a high temperature.

The optical member connecting part 33 according to an embodiment of the present disclosure may include a coupling projection 34 provided in a lower portion thereof. In more detail, the optical member connection part 33 may include the coupling projection 34 provided on the third substrate supporting surface. The coupling projection 34 may be coupled to the coupling hole 20H of the PCB 20. The coupling projection 34 may have a pillar shape, and for example, may have various shapes such as a circular pillar and a polygonal pillar enabling the coupling projection 34 to be coupled to the coupling hole 20H of the PCB 20. The coupling projection 34 according to an embodiment of the present disclosure may include a through hole 30H passing through the inside of the coupling projection 34. The through hole 30H may be coupled to the protrusion 44 of the conductive member 40. The through hole 30H may have a pillar shape which is smaller in size than the coupling projection 34, and for example, may have various shapes such as a circular pillar and a polygonal pillar enabling the through hole 30H to be coupled to the protrusion 44.

A height of the coupling projection 34 according to an embodiment of the present disclosure may be equal to or greater than that of the coupling hole 20H of the PCB 20. That is, when the coupling projection 34 is coupled to the coupling hole 20H, the coupling projection 34 may be exposed to a portion under the PCB 20, or may be coupled to the PCB 20 without being exposed. For example, if a height of the coupling projection 34 is less than that of the coupling hole 20H, the protrusion 44 of the conductive member 40 coupled to the inside of the coupling projection 34 may contact the PCB 20. Therefore, if the conductive member 40 contacts the PCB 20, a static electricity of the conductive member 40 can be induced to the PCB 40 to cause a defect, and thus, the coupling projection 34 prevents the conductive member 40 from contacting the PCB 20.

The conductive member 40 may be disposed on the optical member 30, and in more detail, may be disposed between the PCB 20 and the light incident surface of the light guide plate 144. The conductive member 40 according to an embodiment of the present disclosure may be disposed to face the light incident surface of the light guide plate 144 and may prevent static electricity occurring in the light guide plate 144 from being transferred to the light source 10 or the PCB 20, thereby allowing the static electricity to flow to the light source housing 134. The conductive member 40 may be supported on the optical member 30 or may be coupled and fixed to the coupling groove provided in the optical member 30, and thus, may be electrically connected to the light source housing 134 without contacting the PCB 20.

The conductive member 40 may be formed of a high-dielectric constant material, and for example, may be formed of metal, but is not limited thereto. The conductive member 40 according to an embodiment of the present disclosure may include a first conductive member side surface 41, a second conductive member side surface 42, a conductive member connecting part 43, and the protrusion 44.

The first conductive member side surface 41 may be disposed on one side of the light source 10 and may be coupled to a coupling groove of an upper surface of the first optical member side surface 31. A length of the first conductive member side surface 41 in the X axis direction may be equal to or less than a length of the first optical member side surface 31 in the X axis direction, or may be set less than that of the first optical member side surface 31. A thickness of the first conductive member side surface 41 may be equal to or less than that of the first optical member side surface 31. Alternatively, the thickness of the first conductive member side surface 41 may be set less than that of the first optical member side surface 31, and thus, the first conductive member side surface 41 may be accommodated into a coupling groove provided in the first optical member side surface 31.

The second conductive member side surface 42 may be disposed on the other side of the light source 10 and may be coupled to a coupling groove of an upper surface of the second optical member side surface 32. A length of the second conductive member side surface 42 in the X axis direction may be equal to or less than a length of the second optical member side surface 32 in the X axis direction, or may be set less than that of the second optical member side surface 32. A thickness of the second conductive member side surface 42 may be equal to or less than that of the second optical member side surface 32. Alternatively, the thickness of the second conductive member side surface 42 may be set less than that of the second optical member side surface 32, and thus, the second conductive member side surface 42 may be accommodated into a coupling groove provided in the second optical member side surface 32.

The conductive member connecting part 43 may connect the first conductive member side surface 41 and the second conductive member side surface 42. The conductive member connecting part 43 may be disposed between adjacent light sources of the plurality of light sources 10. A length of the conductive member connecting part 43 in the Z axis direction may be equal to or less than a length of the optical member connecting part 33 in the Z axis direction, or may be set less than that of the optical member connecting part 33. A thickness of the conductive member connecting part 43 may be equal to or less than that of the optical member connecting part 33. Alternatively, the thickness of the conductive member connecting part 43 may be set less than that of the optical member connecting part 33, and thus, the conductive member connecting part 43 may be accommodated into a coupling groove provided in the optical member connecting part 33.

The conductive member connecting part 43 according to an embodiment of the present disclosure may include the projection 44 which is provided in a lower portion thereof and grounds the conductive member 40. The protrusion 44 may be coupled to the through hole 30H provided in the coupling projection 34 of the optical member 30. The protrusion 44 may have a pillar shape which is smaller in size than the through hole 30H, and for example, may have various shapes such as a circular pillar and a polygonal pillar enabling the protrusion 44 to be coupled to the through hole 30H.

A height of the protrusion 44 according to an embodiment of the present disclosure may be greater than that of the coupling hole 20H of the PCB 20. That is, when the protrusion 44 is coupled to the coupling hole 20H, the protrusion 44 may protrude to a portion under the PCB 20. For example, if a height of the protrusion 44 is less than that of the coupling hole 20H, the protrusion 44 may be disposed inside the PCB 20 and cannot be grounded to the light source housing 134. Therefore, the protrusion 44 according to an embodiment of the present disclosure may be coupled to the through hole 30H of the optical member 30 and may protrude to a portion under the PCB 20 through the coupling hole 20H provided in the PCB 20. The protrusion 44 protruding to the portion under the PCB 20 may be electrically connected to the light source housing 134.

A top of the conductive member 40 according to an embodiment of the present disclosure may contact the light guide plate 44, and the protrusion 44 may be electrically connected to the light source housing 134. Therefore, in the backlight unit 140 and the LCD device 100 according to an embodiment of the present disclosure, since static electricity flows out to the light source housing 134 without being transferred to the light sources 10, a short circuit defect of the light source 10 is prevented from occurring due to the static electricity, thereby preventing image quality and reliability from being degraded.

It is to be understood from the above that there may be a plurality of coupling holes 20H, a plurality of corresponding connecting parts 33 each including a coupling projection 34 which includes a through hole 30H, and a plurality of corresponding conductive member connecting parts 43 each including a protrusion 44. Each of the plurality of protrusions 44 may couple with a corresponding through hole 30H of a coupling projection 34, and each coupling projection 34 in turn may couple with a corresponding coupling hole 20H.

It is to be understood that references to relative terms such as "upper", "lower", "top", "bottom", "under", "below" or "above", or similar such terms, are intended to be used in the context of the drawings. Furthermore, references to first and second surfaces may be equivalent to references to lower and upper surfaces respectively.

In the backlight unit and the LCD device according to the embodiments of the present disclosure, the conductive member electrically connected to the light source housing may be disposed between the light guide plate and the light sources, and thus, static electricity flows out to the light source housing without being transferred to the light sources.

Moreover, the backlight unit and the LCD device according to the embodiments of the present disclosure prevent a short circuit defect of the light source from occurring due to static electricity, thereby preventing image quality and reliability from being degraded.

Moreover, in the backlight unit and the LCD device according to the embodiments of the present disclosure, the optical member may be disposed between the PCB and a light incident surface of the light guide plate, and thus, a constant optical gap between the light guide plate and the light source is maintained.

Moreover, in the backlight unit and the LCD device according to the embodiments of the present disclosure, since the optical member surrounds the plurality of light sources, light emitted from each of the light sources is prevented from being incident on an area other than the light incident surface of the light guide plate, thereby minimizing the loss of the light.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A light source module, comprising:
a printed circuit board (PCB);
a plurality of light sources on the PCB;
an optical member on the PCB, the optical member surrounding the plurality of light sources; and
a conductive member coupled to the optical member, the conductive member including a protrusion grounding the conductive member,
wherein the optical member is disposed between the PCB and the conductive member,
wherein the optical member comprises:
a first optical member side surface provided on one side of each of the plurality of light sources;
a second optical member side surface provided on another side of each of the plurality of light sources to face the first optical member side surface; and
an optical member connecting part provided between adjacent light sources of the plurality of light sources to connect the first optical member side surface to the second optical member side surface, and
wherein the optical member connecting part comprises a coupling projection in a lower portion thereof, the coupling projection being coupled to a coupling hole provided in the PCB.

2. The light source module of claim 1, wherein the protrusion protrudes to a portion under the PCB through a hole provided in the PCB.

3. The light source module of claim 1, wherein the conductive member does not contact the PCB.

4. A backlight unit comprising:
a light guide plate including a light incident surface;
the light source module of claim 1, the light source module being disposed to face the light incident surface of the light guide plate; and
a light source housing supporting the light guide plate, the light source module being mounted on the light source housing,
wherein the conductive member is electrically connected to the light source housing.

5. A liquid crystal display device comprising:
the backlight unit of claim 4; and
a liquid crystal panel on the backlight unit.

6. The light source module of claim 1, wherein
the coupling projection comprises a through hole passing through an inner portion of the coupling projection, and
the protrusion is coupled to the through hole.

7. The light source module of claim 6, wherein
the optical member comprises a coupling groove in a top thereof, and
the conductive member is coupled to the coupling groove.

8. The light source module of claim 7, wherein the conductive member comprises:

a first conductive member side surface coupled to a first coupling groove of the coupling groove corresponding to an upper surface of the first optical member side surface;

a second conductive member side surface coupled to a second coupling groove of the coupling groove corresponding to an upper surface of the second optical member side surface; and a conductive member connecting part coupled to a third coupling groove of the coupling groove corresponding to a top of the optical member connecting part.

9. The light source module of claim 8, wherein the conductive member connecting part comprises the protrusion in a lower portion thereof, and a height of the protrusion is greater than a height of the coupling hole of the PCB.

10. The light source module of claim 9, wherein a height of the coupling projection is equal to or greater than a height of the coupling hole.

* * * * *